(12) United States Patent
Nishimura et al.

(10) Patent No.: US 6,620,969 B1
(45) Date of Patent: Sep. 16, 2003

(54) SHELL-AND-TUBE HEAT EXCHANGER AND METHOD FOR INHIBITING POLYMERIZATION IN THE SHELL-AND-TUBE HEAT EXCHANGER

(75) Inventors: Takeshi Nishimura, Himeji (JP); Yukihiro Matsumoto, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/520,744

(22) Filed: Mar. 8, 2000

(30) Foreign Application Priority Data

Mar. 11, 1999 (JP) .......................................... 11-065403
Mar. 16, 1999 (JP) .......................................... 11-070503

(51) Int. Cl.⁷ .......................... C07C 51/42; F28F 13/18; F28F 9/02; F28F 9/22
(52) U.S. Cl. ...................... 562/600; 165/133; 165/158; 165/159
(58) Field of Search ................................ 165/159, 158, 165/133; 562/600

(56) References Cited

U.S. PATENT DOCUMENTS 3,794,567 A * 2/1974 Otsuki et al.
3,892,205 A * 7/1975 Naito et al.
5,101,892 A * 4/1992 Takeuchui et al.
5,772,850 A   6/1998 Morris
5,897,749 A * 4/1999 Kroker et al.

FOREIGN PATENT DOCUMENTS

| EP | A-0 569 644 | 11/1993 |
| EP | A-0589 230 | 3/1994 |
| EP | A-0 854 129 | 7/1998 |
| GB | A-1 265 738 | 3/1972 |
| JP | 401180850 A * | 7/1989 |

OTHER PUBLICATIONS

Section VIII Rules for Construction of Pressure Vessels, Division 1, ASME Boiler and Pressure Vessel Code, Jul. 1, 1992, pp. 461–466.

* cited by examiner

Primary Examiner—Shailendra Kumar
Assistant Examiner—Paul A. Zucker
(74) Attorney, Agent, or Firm—Mathews, Collins, Shepherd & McKay, P.A..

(57) ABSTRACT

A shell-and-tube heat exchanger for handling an easily polymerizable substance is disclosed, which is characterized by having no part for stagnation of said process fluid on the surfaces for contact with the process fluid. By eliminating undulations from the inner surfaces of the heat transfer tubes, it is made possible to prevent the easily polymerizable substance from polymerizing and, at the same time, prevent adhesion of a polymer to the surfaces. Thus, the efficiency of heat exchange is enhanced and the protracted continuous operation is realized.

17 Claims, 8 Drawing Sheets

SHELL-AND-TUBE HEAT EXCHANGER AND METHOD FOR INHIBITING POLYMERIZATION IN THE SHELL-AND-TUBE HEAT EXCHANGER

BACKGROUND OF THE INVENTION

1. Field of the Invention

This invention relates to a shell-and-tube heat exchanger and a method for inhibiting polymerization in the shell-and-tube heat exchanger. More particularly, this invention relates to a shell-and-tube heat exchanger intended to handle an easily polymerizable substance and characterized by having no stagnating part of a process fluid on the surface thereof for contact with the process fluid. Particularly, this invention relates to a method for inhibiting polymerization in a shell-and-tube heat exchanger, characterized by using a seamless steel tube as the heat transfer tube for the shell-and-tube heat exchanger during the operation of the heat exchanger on an easily polymerizable substance. This method permits effective inhibition of the polymerization of an easily polymerizable substance which possibly occurs in a heat transfer tube.

2. Description of Related Art

The shell-and-tube heat exchanger for effecting exchange of heat extensively between two fluids, one having a high temperature and the other a low temperature, is one of the chemical machines that are extensively used in the chemical industry. The shell-and-tube heat exchanger exhibits high reliability under harsh use conditions and during a protracted continuous operation and, owing to this conspicuous merit, has been finding greater utility than any other kind of heat exchanger. In all the species of shell-and-tube heat exchanger, the tube sheet heat exchanger is characterized by containing at least one built-in tube sheet in each of the opposite terminal parts of a tubular shell thereof and interconnecting the opposed tube sheets with a multiplicity of heat transfer tubes having the opposite terminal parts thereof fixed peripherally.

Figure 1:
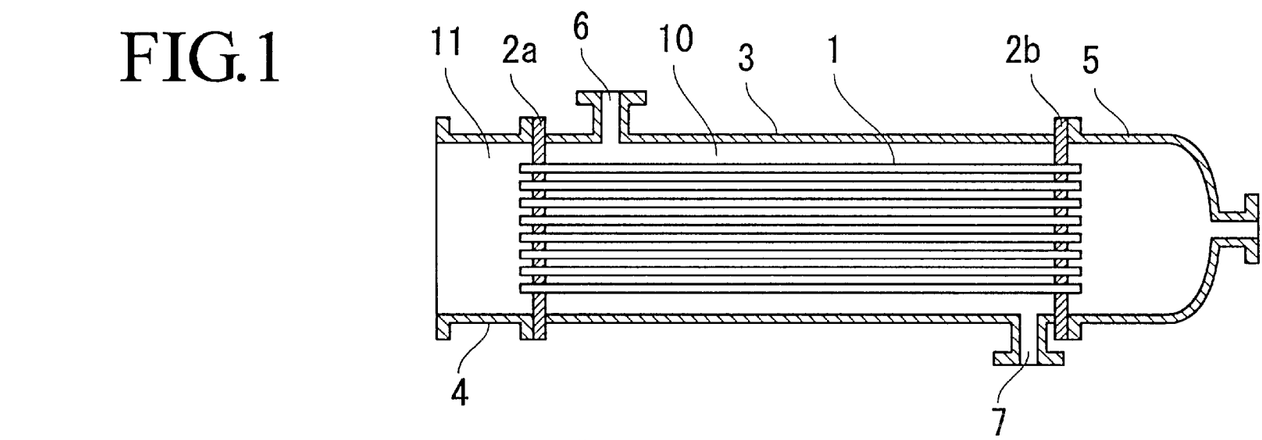
FIG. 1 is a cross section of the conventional shell-and-tube heat exchanger.
Figures 3A, 3B:
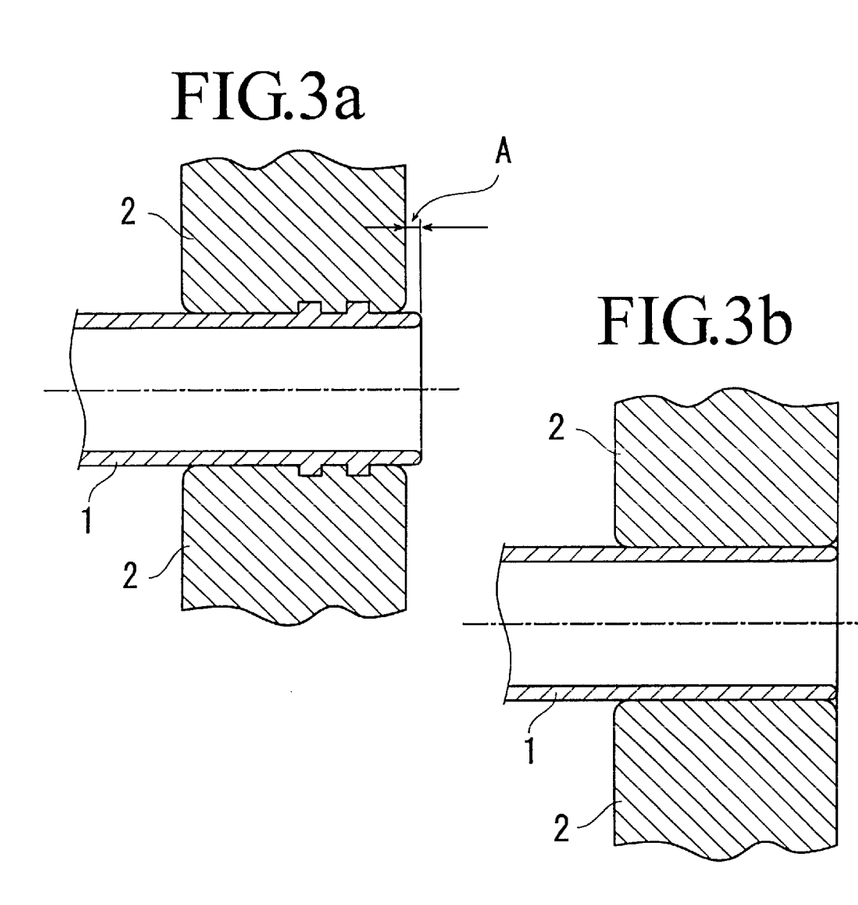
FIG. 3a is a cross section illustrating the relation of connection between the surface of the tube sheet and the heat transfer tubes in the conventional heat exchanger, letter "A" meaning a protrusion.
FIG. 3b is a cross section of a shell-and-tube heat exchanger according to this invention which has no part for stagnating the process fluid formed on the surface of contact with the process fluid.

In the conventional vertical tube sheet heat exchanger such as is illustrated in FIG. 1, for example, the tube side fluid (11) is introduced into the heat transfer tubes via the upper tube sheet (2a) near the shell side fluid outlet (6) and then discharged from the terminals of this heat transfer tubes (1) out of the heat exchanger via the lower tube sheet (2b) and the lower channel (5). A shell side fluid (10) is introduced into a shell (3) via an shell side fluid inlet (7) and is discharged from the shell (3) via an shell side fluid outlet (6), with the result that heat is exchanged between the tube side fluid (11) and the shell side fluid (10). The connecting parts used herein between the tube sheet (2a, 2b) and the heat transfer tubes (1) are so fixed as to allow protrusion of the heat transfer tubes (1) from the tube sheet as illustrated in FIG. 3a with the object of securing strong connection and permit easy attachment of a multiplicity of heat transfer tubes (1). The heat exchanger generates vibration because of constant inward and outward passage respectively of the tube side fluid (11) and the shell side fluid (10) and the heat transfer tubes (1) receive this vibration because of transmission of vibration from a pump and a compressor and direct pulsating flow from rotary machines. For the purpose of preventing this vibration from loosening the fixing parts of the heat transfer tubes (1) and ultimately inducing the fixing parts to leak, therefore, the strength necessary for this prevention is secured by causing the heat transfer tubes (1) to protrude from the surface of the tube sheets (2a, 2b).

Further, in order to exalt the efficiency of heat transfer, it is necessary that the surface of contact with the shell side should be enlarged and the heat transfer tubes (1) should be reduced in diameter. The object of fixing stably the multiplicity of such slender heat transfer tubes (1) is easily attained by joining the heat transfer tubes (1) to the surface of the tubes sheets (2a, 2b) as protruded therefrom.

The surfaces of heat transfer in the shell-and-tube heat exchanger are gradually fouled with a deposit of extraneous substance and degraded in the efficiency of heat transfer with the elapsing of use time. The fouling requires the heat exchanger to be repaired and prevents it from allowing a protracted operation easily. This fouling occurs when the fluid contains a solid substance or a semi-solid substance. When the process fluid itself is not a solid substance but has an easily polymerizable substance as a component thereof, it produces a polymer in the shell-and-tube heat exchanger and the polymer fouls the heat exchanger. Particularly, in the case of the shell-and-tube, the polymerization generated in the heat transfer tubes (1) tends to interfere with the protracted continuous operation of process because this heat exchanger uses numerous heat transfer tubes of a minute diameter with a view to enhancing the efficiency of heat transfer. The adhesion of the polymer to the inner walls of the heat transfer tubes results in obstructing the process of continuous purification by degrading the heat transfer tubes in the efficiency of heat transfer and clogging the heat transfer tubes.

The shell-and-tube heat exchanger (condenser) which is led from the top of a distillation column, for example, causes the vapor ascending to the top of the distillation column and abounding in a low boiling component to be cooled and condensed in the heat transfer tubes. When the object of distillation is such an easily polymerizable compound as acrylic acid, it tends to polymerize in the condenser. Acrylic acid, for example, is produced by catalytic vapor phase oxidation of propylene and/or acrolein with a molecular oxygen-containing gas and the acrylic acid-containing liquid consequently formed is distilled in the distillation column. In the composition of this acrylic acid-containing liquid, the acrylic acid is unusually susceptible of polymerization because this composition contains such impurities as water, acetic acid, and acrolein.

Further, the degree of the polymerization of the easily polymerizable substance increases in accordance with the heating advances. Since the internal temperature of the distillation column in the process for purifying an easily polymerizable substance is governed by the boiling point of the easily polymerizable substance being purified and the boiling point of a solvent which is contained in conjunction with a high boiling substance to be separated and the easily polymerizable substance, it is difficult to adjust the internal temperature of the shell-and-tube heat exchange solely for the purpose of preventing the polymerization. Especially, when the shell-and-tube heat exchanger is used as a re-boiler, it tends to induce the polymerization because it has a particularly high working temperature.

For the purpose of preventing the polymerization of such an easily polymerizable substance, the practice of adding various polymerization inhibitors such as phenothiazine, hydroquinone, methoquinone, cresol, phenol, and t-butyl catechol to the purification process has been in vogue. Such a polymerization inhibitor is a high boiling substance. It is allowed to manifest a fully satisfactory effect of inhibiting the polymerization in the bottom liquid of the distillation column. Under the temperature conditions that cause the easily polymerizable substance to vaporize, however, this polymerization inhibitor is not contained in the produced vapor. In the condenser disposed at the top of the distillation column, since the vapor easily polymerizable substance does not contain the polymerization inhibitor, the composition itself assumes a state extremely susceptible of polymerization and incurs difficulty in repressing the polymerization of the easily polymerizable substance in the vapor state. When the tube sheet heat exchanger has a shell-and-tube construction, therefore, since it has such protrusions of heat transfer tubes as mentioned above on the upper tube sheet of the condenser, the polymer adheres to the protrusions. The adhesion of the polymer results in degrading the efficiency of separation, clogging the heat transfer tubes, and consequently obstructing the protracted continuous operation of the process.

It has been heretofore necessary, therefore, to give a periodic inspection to the interior of the shell-and-tube heat exchanger and deprive the shell-and-tube heat exchanger of the adhering polymer, if any, with the object of maintaining the efficiency of heat exchange at a high level and, at the same time, preventing the efficiency of separation and purification from lowering and the quality of product from deteriorating.

SUMMARY OF THE INVENTION

The present inventors have discovered that the polymerization occurring otherwise in the shell-and-tube heat exchanger can be effectively inhibited by preventing the stagnation of the process fluid possibly induced on the surfaces of contact with the process fluid such as of the surface of the tube sheet. This invention has been perfected as a result. Further, the present inventors have made a detailed study of the polymer which occurs when an easily polymerizable substance is subjected to a treatment in the shell-and-tube heat exchanger and have consequently discovered that the polymer adheres to such minute undulations as in a seam which is formed during the production of a heat transfer tubes and that the adhesion of the polymer can be prevented by eliminating these undulations.

Specifically, this invention has the object of providing the following items (1) to (3).

(1) A shell-and-tube heat exchanger for handling an easily polymerizable substance, composed of a shell having built therein near the opposite terminals thereof two tube sheets respectively furnished with an inlet and an outlet for shell side fluid (10), channels disposed one each at the opposite terminals of said shell, and a multiplicity of heat transfer tubes having the peripheries of the opposite terminal parts thereof fixed between said tube sheets, adapted to pass an easily polymerizable substance as a process fluid through said tubes and effect exchange of heat thereon, and characterized by having no part for stagnation of said process fluid on the surfaces for contact with said process fluid.

(2) In the operation of a shell-and-tube heat exchanger of Item 1 by passing there through an easily polymerizable substance as a process fluid thereby effecting change of heat thereon, a method for inhibiting polymerization in a shell-and-tube heat exchanger characterized by having said process fluid contain a polymerization inhibitor.

(3) A method for preparing (meth) acrylic acid and/or an ester thereof using at least any one of shell-and-tube heat exchanger according to Item (1).

BRIEF DESCRIPTION OF THE DRAWINGS

FIGS. 4a, 4b, 4c, and 4d are cross sections respectively of vertical shell-and-tube heat exchangers of this invention which are provided with varied upper lid parts and rear lid parts; FIG. 4a depicting a mode using a upper channel in the shape of bonnet, FIG. 4b a mode using a upper channel in the shape of conical, FIG. 4c a mode using a mode using a channel in the shape of miter bend, and FIG. 4d a mode being integral with tube sheet removable cover.

DESCRIPTION OF PREFERRED EMBODIMENT

This invention relates to a shell-and-tube heat exchanger having no part for stagnating the process fluid and characterized by ensuring the absence of a part for stagnating the process fluid from the surface for contact with the process fluid as by eliminating a protrusion of a heat transfer tube from the surface of tube sheet destined to contact the process fluid.

When an easily polymerizable substance is condensed by using the conventional vertical shell-and-tube heat exchanger as a condenser, it produces a polymer and this polymer adheres to the protrusion in the terminal part of a heat transfer tube which exists on the surface of an upper tube sheet. In this adhesion of the polymer, the protrusion does not simply function as a surface for adhesion. Where the easily polymerizable substance is in a vapor state and the polymerization inhibitor mixed therewith has a high boiling point, the condensate of the vapor does not contain the polymerization inhibitor and tends to polymerize under the condition of high temperature within the heat exchanger. The presence of protuberances of heat transfer tubes on the surface of the tube sheet implies the presence of depressions in the portions other than those occupied by the protuberances. The condensate of the part of the process fluid which stagnates in these depressions gives rise to the polymerization.

This invention is capable of not only repressing the adhesion of the polymer but also permitting effective repression of the polymerization itself by ensuring the absence of a part for stagnating the process fluid from the surface of contact with the process fluid as by removing the protrusions and eliminating the protuberances and depressions from the surface of tube sheet. The fact that the shell-and-tube heat exchanger acquires such an outstanding effect from a minor improvement achieved therein has never been predicted heretofore. As a result, this invention enhances the efficiency of separation and purification, allows effective repression of the possible blockage of the flow paths through the heat transfer tubes, and permits the shell-and-tube heat exchanger to be continuously operated for a long time.

This invention is aimed at providing a tube sheet heat exchanger comprising a shell having built in near the opposite terminals thereof two tube sheets each furnished with an inlet and an outlet for shell side fluid (10), channels disposed one each at the opposite terminals of the shell, and a multiplicity of heat transfer tubes having the peripheries of the opposite terminal parts thereof fixed between the tube sheets and characterized by the absence of a part for stagnating the process fluid from the connecting parts between the tube sheets and the heat transfer tubes.

Figure 2:
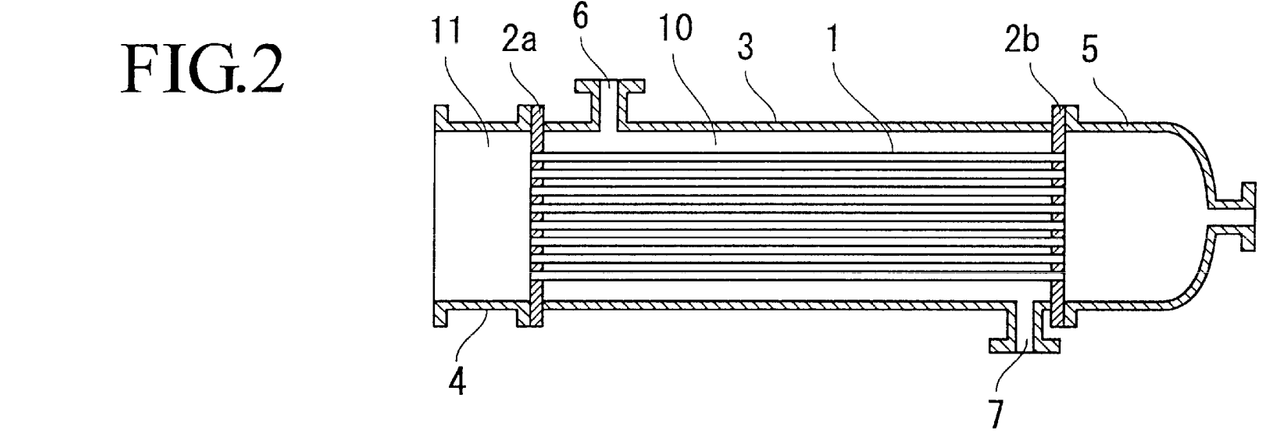
FIG. 2 is a cross section of one mode of the shell-and-tube heat exchanger of the present invention.

If this heat exchanger is designed in a vertical construction which requires the process fluid to be passed through the interiors of heat transfer tubes, the process fluid will possibly stagnate on the surface of tube sheet which exists in the upper part of the heat exchanger. It is for the purpose of effectively preventing this possible stagnation that the shell-and-tube heat exchanger which is furnished with two tube sheets is adopted as the object of this invention. Even if the heat exchanger is designed in a horizontal construction, the protuberances on the surface of the tube sheet mentioned above will stagnate the process fluid currently contacting the surface of the tube sheet and will induce the polymerization of the substance under treatment. The shell-and-tube heat exchanger of this invention, therefore, can be applied to the so-called fixed tube sheet heat exchanger and the floating head heat exchanger without reference to the choice between the vertical construction and the horizontal construction. FIG. 2 is a diagram illustrating one mode of the shell-and-tube heat exchanger according to this invention. Now, this heat exchange will be described below with reference to this diagram.

FIG. 2 depicts the shell-and-tube heat exchanger in which the process fluid begins to flow from an upper channel (4), passes through the interiors of heat transfer tubes (1), and departs from the heat exchanger via a lower channel (5). A shell side fluid (10) is introduced into a shell (3) via an shell side fluid inlet (7) and is discharged from the shell (3) via an shell side fluid outlet (6), with the result that heat is exchanged between the process fluid and the shell side fluid (10).

The shell-and-tube heat exchanger of this invention does not need to be particularly discriminated on account of the shape of the shell (3) but is only required to allow the process fluid which has been brought into the heat transfer tubes (1) to be introduced into the heat transfer tubes (1) which are connected to the tube sheets (2a, 2b). As respects the mode of reservation of the shell side fluid (10), the operation of the heat exchanger does not need to be limited to one-pass supply but may resort to two-pass supply or three-pass supply instead. In terms of the pattern of partitioning the interior of the shell (3), any of the supply flows types such as, for example, a type of two-pass flow using a longitudinal baffle plate, a type of split flow, a type of double split flow, a divided flow, etc. may be adopted for the operation of the heat exchanger.

Figure 4A:
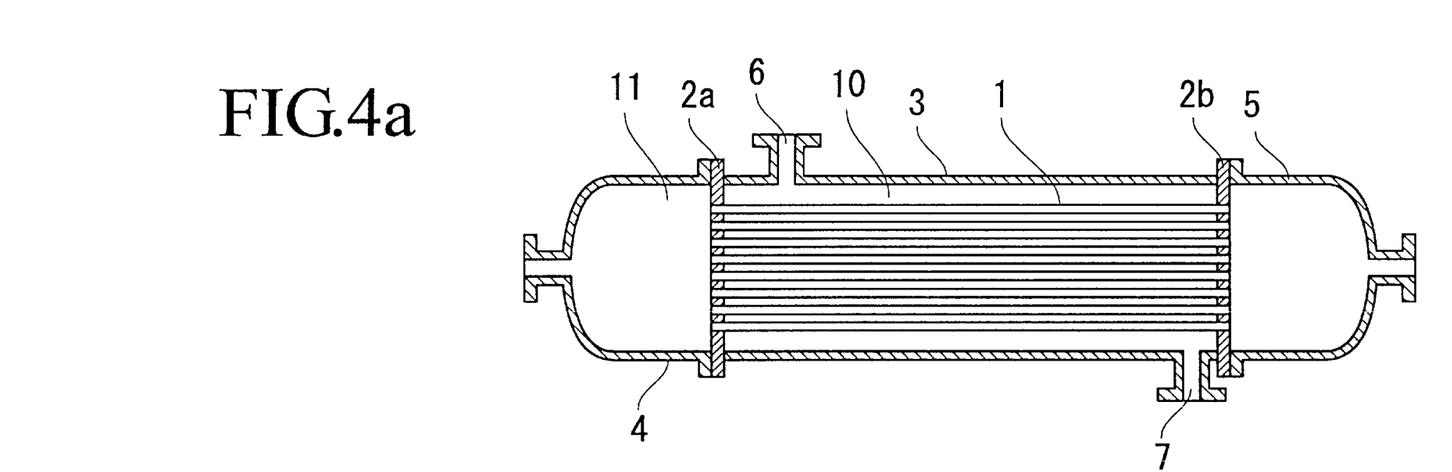
Figure 4B:
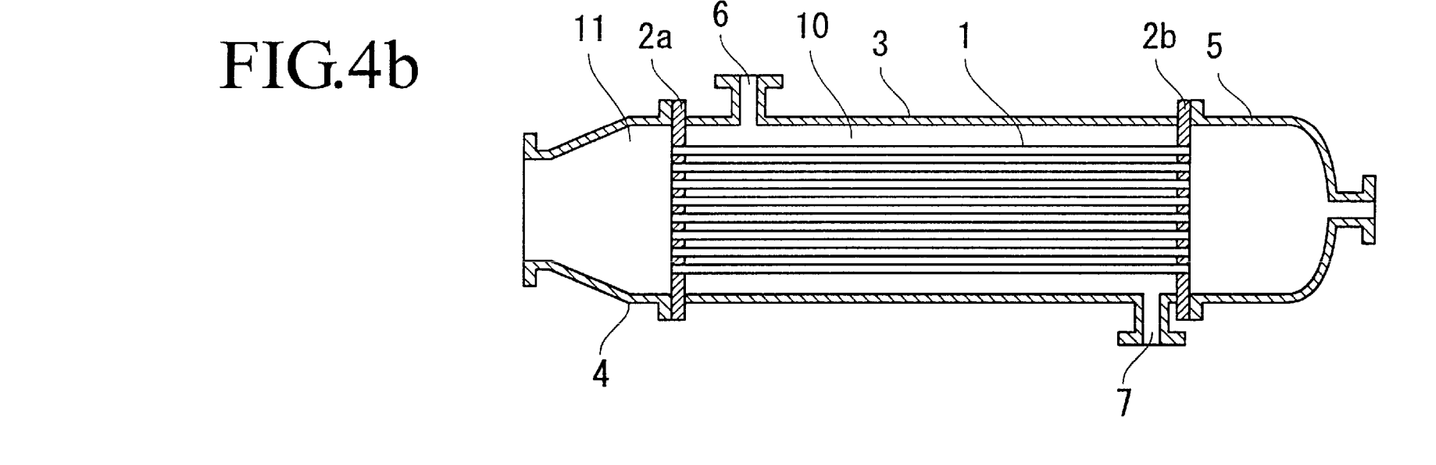
Figure 4C:
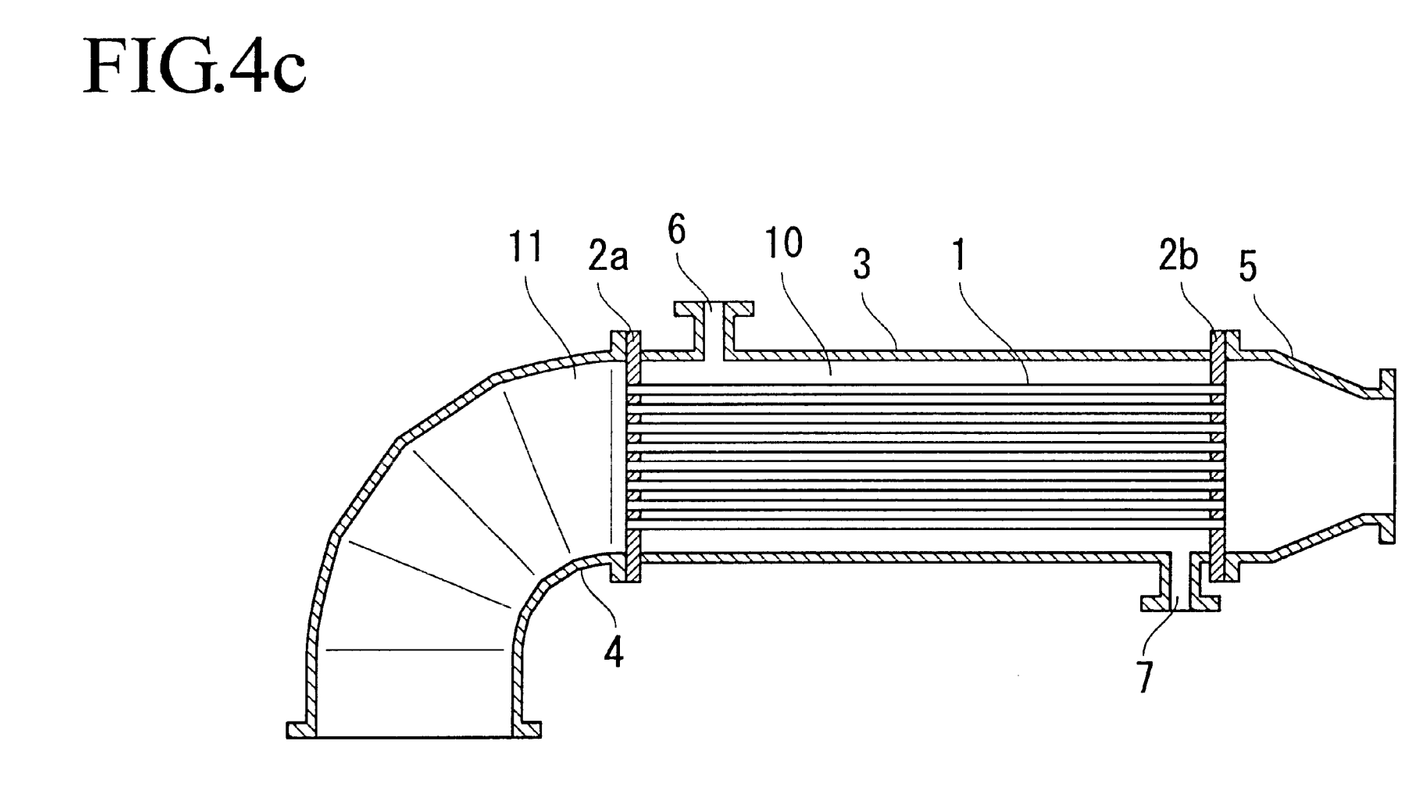

The shell (3) of the shell-and-tube heat exchanger is provided at the opposite terminal parts thereof with tube sheet (2a, 2b), furnished with an shell side fluid inlet (7) and an shell side fluid outlet (6), and also provided at the opposite terminals thereof with channels (4) and (5). The shell-and-tube heat exchanger of this invention, in spite of the designation thereof, can be used as a re-boiler or a condenser as will as described specifically herein below. The channel of the head part may be in any of various types such as, for example, a removable channel and cover type, a bonnet (integral cover) type, and a integral with tube sheet removable cover type. Further, when the heat exchanger to be used is in such a vertical type as illustrated in FIG. 4c, the upper channel (4) may be furnished with a flow path in the shape of miter bend for passing the process fluid. The rear channel (5) may be likewise any of the various types such as, for example, a fixed tube sheet type, a outside packed floating head type, a floating head with backing device type, and a pull-through floating head type. The size of the shell (3) may be properly selected to suit the purpose of use.

The outside diameter, length, etc. of the heat transfer tube which is disposed in the shell (3) may be properly selected to suit the size, shape, and purpose of use of the heat exchanger.

Figure 7A:
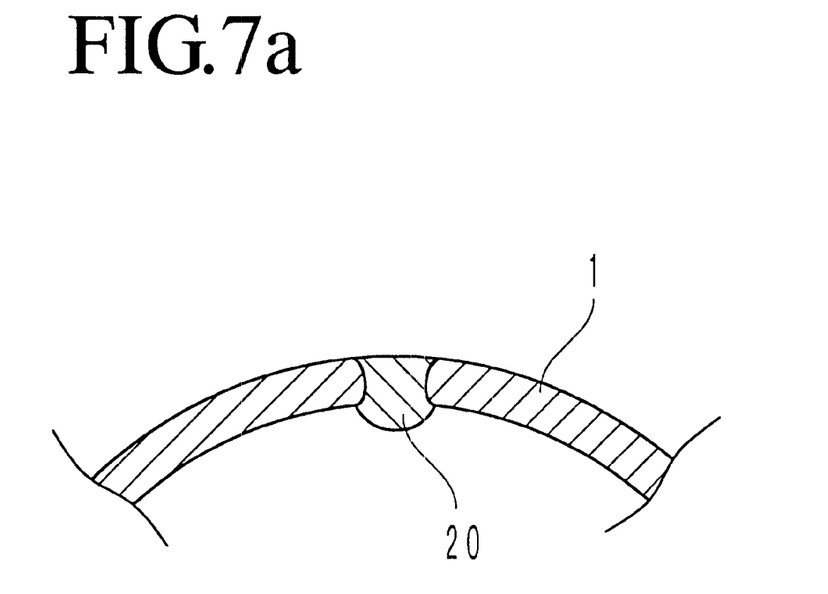
FIG. 7A is a diagram illustrating a welded steel tube used in the conventional heat transfer tube and having beads formed inside the heat transfer tube and FIG. 7B. is a diagram illustrating a cold-finished automatic arc welded steel tubes to be used in the present invention and having no bead formed inside the heat transfer tube.

In this invention, however, it is proper to use in heat transfer tubes of the shell-and-tube heat exchanger intended to treat an easily polymerizable substance such a steel tube as a seamless steel tube which is devoid of undulations on the surface. For the heat transfer tubes heretofore used in the shell-and-tube heat exchanger, a welded steel tube which is deprived of beads on the outer surface as illustrated in FIG. 7A has been predominantly adopted. A detailed inspection of the polymer produced in the heat transfer tubes reveals that the polymer mainly adheres to the beads, i.e. undulations, which exist in the heat transfer tubes. This invention, by using seamless steel tubes, cold-finished automatic arc welded steel tubes, and automatic arc welded steel tubes having the welded parts finished by machining, accomplishes elimination of undulations in the heat transfer tubes and prevention of the polymerization itself.

Where the easily polymerizable substance is in a vapor state, the polymerization inhibitor mixed therewith at all is not incorporated in the condensate of the vapor and the condensate is liable to polymerize under the condition of high temperature in the heat exchanger. When undulations are present in the heat transfer tubes, therefore, the process fluid tends to stagnate in the depressions included in the undulations and the easily polymerizable substance succumbs to polymerization in consequence of the stagnation. Heretofore, a seamless steel tube has been used in tubes laid at various places including cooling tubes in an atomic furnace and tubes laid where a highly corrosive substance is treated or where the working pressure is very high. The process for producing an easily polymerizable substance, however, has no experience of using a seamless steel tube in heat transfer tubes of the shell-and-tube heat exchanger. This is because the process has no need for treating an easily polymerizable substance under the condition of such high pressure or under the condition of such high corrosion as to necessitate use of a seamless steel tube.

By using seamless steel tubes, cold-finished automatic arc welded steel tubes, and automatic arc welded steel tubes having the welded parts finished by machining are used for heat transfer tubes in accordance with this invention and consequently eliminating undulations in the heat transfer tubes, it is made possible to accomplish the heretofore unattainable prevention of the polymerization itself and further prevent the adhesion of the polymer to the protuberances in the heat transfer tubes. This invention, therefore, enables the easily polymerizable substance to be continuously treated without any degradation in the efficiency of heat transfer. The fact that the shell-and-tube heat exchanger acquires such an excellent effect from a minor improvement achieved therein has never been predicted heretofore.

Preferably, the heat transfer tubes which serve the purpose of passing the process fluid are seamless steel tubes, cold-finished automatic arc welded steel tubes, or automatic arc welded steel tubes having the welded parts finished by machining, whichever suit the occasion best. This is because the elimination of undulations in the heat transfer tubes results in removing the part for stagnation of the process fluid and the part for adhesion of the polymer.

Figure 7B:
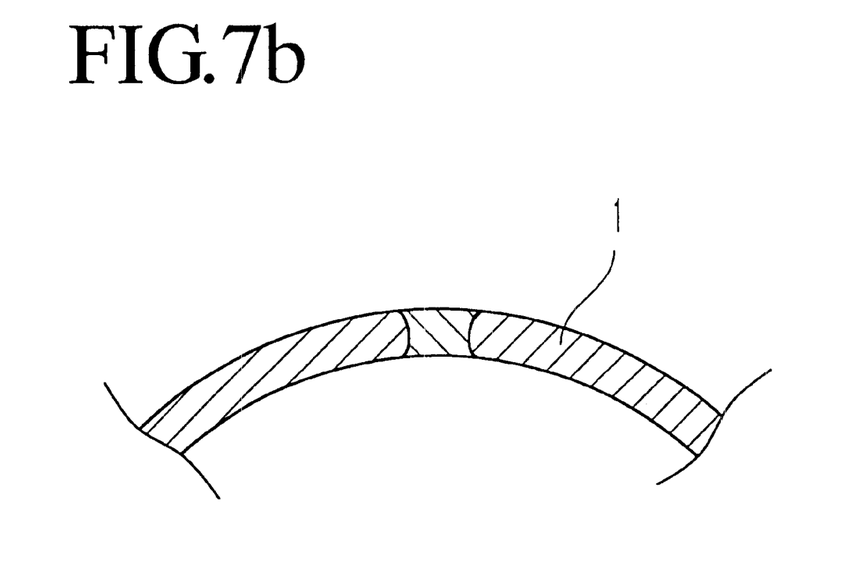

The term "seamless steel tube" as used herein refers to the seamless steel tube which is defined in JIS (Japanese Industrial Standard) G 0203 (-1994), namely the seamless steel tube which is produced by hot rolling, extruding, and punching a steel ingot or steel block or produced by drilling and then machine finishing a steel ingot. This term also embraces a cold-finished seamless steel tube which is obtained by cold drawing a seamless steel tube. Then, the term "cold-finished automatic arc welded steel tube" refers to the automatic arc welded steel tube which is defined in JIS G 0203 (-1994), namely the steel tube which is produced by forming a steel sheet or a steel belt in a cylindrical shape and welding the seam by the TIG welding method, the plasma arc welding method, or the MIG welding method thereby affording a steel tube, and subsequently cold-finishing at least the beads in the heat transfer tube. The term "automatic arc welded steep tube having the welded part machine finished" refers to the steel tube which is produced by preparing an automatic arc welded steel tube and subsequently rolling the beads formed inside and outside the steel tube. An automatic arc welded steel tube obtained after cold finishing the beads formed inside a heat transfer tube is illustrated in FIG. 7B.

This invention represses the polymerization itself of an easily polymerizable substance and prevents the adhesion of a polymer by eliminating the undulations formed on the surface for contact with the process fluid in the heat transfer tubes. This invention is applicable not exclusively to the seamless steel tube but equally to a welded heat transfer tube which has no undulation on the surface. The welded steel tube excels in surface smoothness and dimensional accuracy, acquires a uniform wall thickness excepting on the weld formed along the seam, and enjoys advantages such as offering a wide dimensional range and allowing easy and inexpensive production of a tube of small wall thickness. The seamless steel tube, meanwhile, fits the use under the condition of an elevated temperature because it has no part joined by welding. When the shell-and-tube heat exchanger is used as a re-boiler, therefore, the heat transfer tubes are preferred particularly to use seamless steel tubes. When the heat exchanger is used as a condenser, the heat transfer tubes are preferred to use seamless steel tubes, cold-finished automatic arc welded steel tubes and automatic arc welded steel tubes having the welded parts finished by machinig. These various species of steel tubes may be used as freely mixed for the heat transfer tubes which are laid in the shell-and-tube heat exchanger.

The heat transfer tubes which are laid in the shell-and-tube heat exchanger do not need to be limited to the linear shape but may be in U type bundle. The outside diameter, length, etc. of the heat transfer tubes may be properly selected to suit the size, shape, and purpose of use of the heat exchanger to be used.

The material for the heat transfer tubes, steel tubes, and tube sheets does not need to be particularly limited. From the viewpoint of the ease of manufacture of a welded steel tube, an austenite type steel tube, an austenite ferrite type steel tube, and ferrite type steel tube prove to be proper. These steel tubes are at an advantage in not reacting with the easily polymerizable substance, not adversely affecting the easily polymerizable substance, and not inducing the heat transfer tubes themselves to corrode.

Figure 3C:
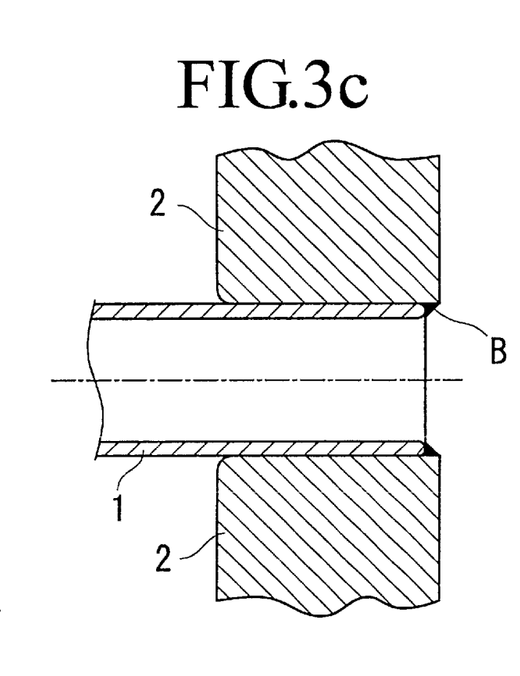
FIG. 3c is a cross section of a shell-and-tube heat exchanger having a welded part "B" provided for the surface of the tube sheet and the heat transfer tubes and having no part for stagnating the process fluid formed on the surface of contact with the process fluid.

In the shell-and-tube heat exchanger of this invention, the tube sheets disposed in the opposite terminal parts of the heat transfer tubes are joined to the peripheries of the terminal parts of the heat transfer tubes through the medium of the holes formed in the tube sheets. In the conventional state of fixing which is illustrated in FIG. 3a, since the protrusions of the heat transfer tubes (1) which exist on the surfaces of tube sheet (2) give rise to depressions, the process fluid stagnates in the depressions. This invention eliminates the parts for such stagnation by removing the protrusions in the terminal parts of the heat transfer tubes (1) from the surfaces of the tube sheet (2) for contact with the process fluid as illustrated in FIG. 3b. This invention allows the heat transfer tubes (1) to be embedded under the surfaces of tube sheet (2) so long as the terminal parts of the heat transfer tubes (1) avoid protruding from the surfaces of the tube sheets (2a, 2b) as shown, for example, in FIG. 2. In this case, the connecting parts between the tube sheet (2b) and the heat transfer tubes (1) are so welded as to avoid forming a depression as illustrated in FIG. 3c, consequently the connecting parts between the tube sheet (2) and the heat transfer tubes (1) should not give rise to a part for stagnating the process fluid.

In this invention, the heat transfer tubes (1) are fixed as inserted through the holes formed in the tube sheet (2a, 2b). The holes may use a sealing material for the purpose of ensuring tightness between the peripheries of the heat transfer tubes (1) and the holes. The sealing material may be a tape which is wound round the heat transfer tubes or a packing which is fastened to the hole. The material for this packing is only required to excel in resistance to heat and resistance to pressure and avoid reacting with the process fluid. A fluorine-containing elastomer or silicon may be used as the material that answers this description. The attachment of the heat transfer tubes to the tube sheet (2) without using the sealing material may be attained by incising several grooves in the tube sheets and then expanding the heat transfer tube (FIG. 3a) or by resorting to the welding (FIG. 3c). This invention prefers this attachment to be attained by welding. The welding is preferred because it permits relatively easy attachment of a multiplicity of heat transfer tubes and, at the same time, prevents these heat transfer tubes from leaking the process fluid.

In this invention, various methods are available for the purpose of eliminating the protrusions of the heat transfer tubes from the surfaces of the tube sheets destined to contact the process fluid. A method which comprises disposing the terminal parts of the heat transfer tubes flush with the surfaces of the tube sheets and fixing them to the tube sheets by welding and a method which comprises disposing the terminal parts of the heat transfer tubes as sunken below the surfaces of the tube sheets, then fixing the terminal parts of the heat transfer tubes by welding to the holes in the tube sheets, and further filling the sunken parts with a welding material and polishing the filling material till the surfaces thereof become flush with the tube sheets may be cited for example. Alternatively, a method which comprises preparatorily setting the heat transfer tubes in such a manner as to have the protrusions thereof protrude from the surfaces of the tube sheets and removing the protrusions as by cutting after the heat transfer tubes have been fastened may be cited.

Figure 5:
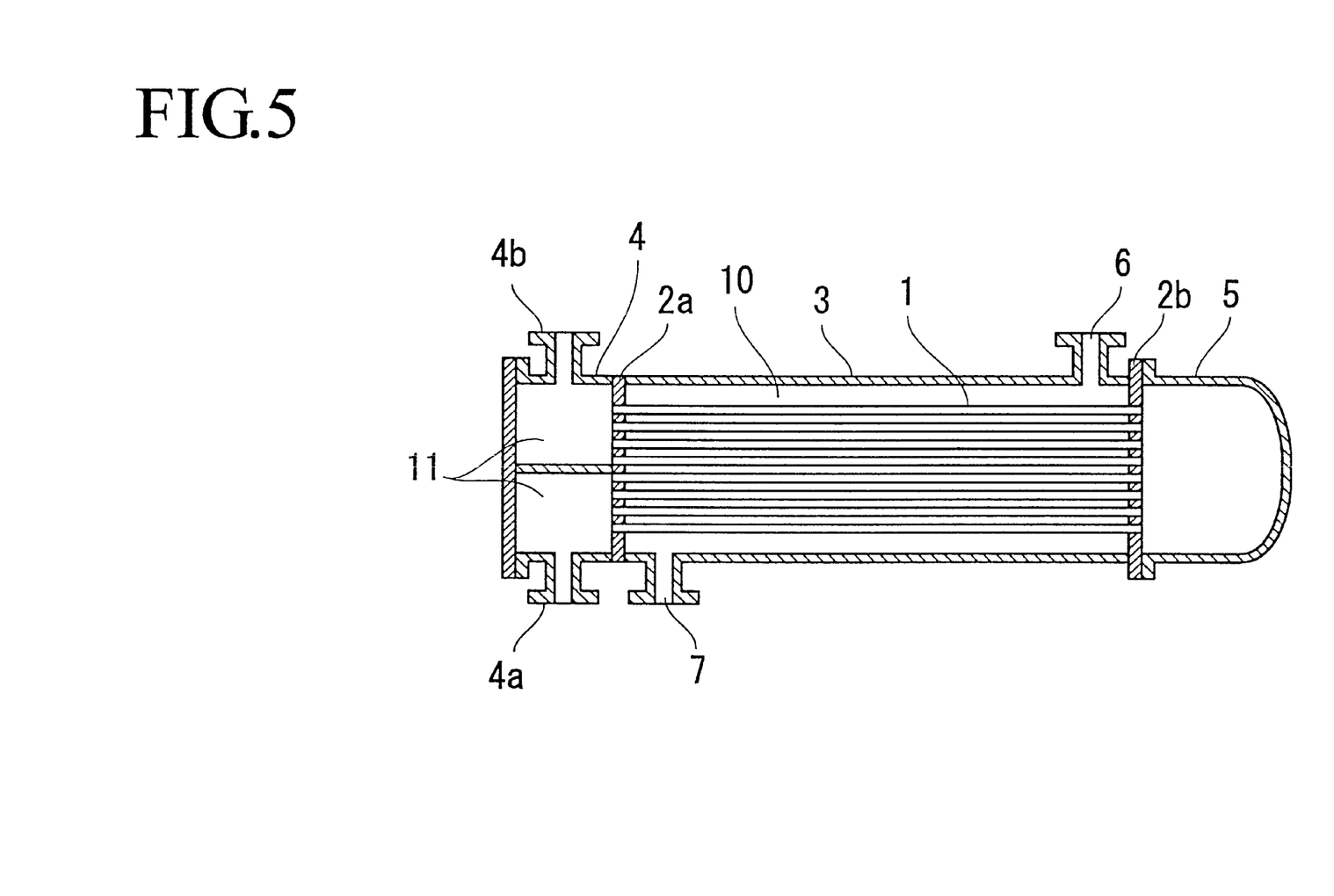
FIG. 5 is a cross section of a horizontal shell-and-tube heat exchanger according to this invention.

In this invention, the protrusions of the heat transfer tubes from the surfaces of the tube sheets are preferred to be eliminated throughout the entire surfaces of the two tube sheets which are destined to contact the process fluid. The reason for requiring this thorough elimination is that the presence of such protrusions results in inducing stagnation of the process fluid. In consideration of the, efficiency of the prevention of stagnation, however, it is proper particularly in the vertical shell-and-tube heat exchanger to effect the elimination of the protrusions of the heat transfer tubes on the surface of the upper tube sheet while the heat exchanger is in a finally installed state. The reason for requiring this particular manner of elimination is that when the shell-and-tube heat exchanger of this invention is used as a condenser, the process fluid which is in a vapor state tends to condense on the upper tube sheet side and the condensate drops spontaneously under its own weight on the lower tube sheet side. Further, when the Ishell-and-tube heat exchanger of this invention is used as a re-boiler, the process fluid which is introduced into the heat transfer tubes via the lower tube sheet (2b) possibly condensed and suffered to stagnate on the surface of the upper tube sheet (2a). Again in this case, the elimination of the protrusions in the particular manner mentioned above affords effective prevention of this stagnation of the condensate. In the case of the horizontal shell-and-tube heat exchanger of such a two-pass construction as illustrated in FIG. 5, however, it is proper to remove the protrusions of the heat exchange tubes on the surfaces of both two tube sheets which are destined to contact the process fluid. The removal effected in this manner is preferred because it prevents the horizontal heat exchanger from entailing the disadvantage of suffering the process fluid to stagnate on the protrusions during the suspension of the operation and the stagnating fluid to polymerize before the operation is resumed. In FIG. 5, the tube side fluid (11) enter from a tube side fluid inlet (4a) of the first channel (4), passes through the interiors of heat transfer pipes (1) and the second channel (5), then passes through again the other heat transfer pipes (1), and departs from the heat exchanger via a tube side fluid outlet (4b) of the first channel (4).

Further, in this invention, the surfaces for contact with the process fluid such as the surfaces of the tube sheet (2a, 2b) are preferred to be such that the magnitude of roughness, Ry, defined in JIS B 0601 (-1994) as in a rough curved line which is set on a horizontal line and cut off in a standard length along the horizontal line, the height of a top of the rough from the horizontal line and the depth of a bottom of the rough from the horizontal line, may be not more than 12.5 μm, preferably not more than 3.2 gm. The reason for this particular limitation is that the stagnation of the process fluid which occurs on the protrusions of the heat transfer tubes (1) also occurs even on only minor undulations on the surfaces of the tube sheets.

Particularly, the polymerization can be effectively prevented by adjusting the magnitudes of roughness of the inner surfaces of the heat transfer tubes (1) within the range mentioned above. To be specific, since the polymerization in the heat transfer tubes (1) is caused by the undulations which are present within the heat transfer tubes (1), the heat transfer tubes (1) are characterized by using seamless steel tubes, cold-finished automatic arc welded steel tubes, and automatic arc welded steel tubes having the welded parts finished by machining. The polymerization of the easily polymerizable substance is liable to occur not only in the undulations of surfaces but also in the condensate adhering to the inner surfaces of the heat transfer tubes. For the sake of preventing this polymerization, therefore, it is proper to expel the condensed process fluid promptly from the shell-and-tube heat exchanger, namely to degrade the inner surfaces of the heat transfer tubes in surface roughness. The heat transfer tubes acquire inner surfaces having the magnitudes, Ry defined in JIS B 0601 (-1994), of not more than 12.5 by either using or subjecting the inner surfaces to a treatment of mechanical polishing or electrolytic polishing.

The surfaces of the tube sheets having such magnitudes of surface roughness can be produced by welding the heat transfer tubes fast to the surfaces of the tube sheets. Optionally, these surfaces may be given a further surface treatment.

For this surface treatment, mechanical polishing such as buffing and electrolytic polishing are available. The buffing is a method of polishing which is used mainly for obtaining a flat smooth surface or a glossy surface. Optionally, the coarse polishing with a stationary grinding agent or the medium polishing or finish polishing with a semisolid or loose grinding agent may be adopted instead. For the buff abrasion, such flexible materials as leather and cloth and oily and non-oily sprays containing tripoly silica stone, chromium oxide, silicon carbide, fused alumina, calcined alumina, and chromium oxide as abradants may be used.

The electrolytic polishing is a method for smoothing a metal surface by solution. For the electrolytic polishing of heat transfer tubes which are made of iron or steel, the abradants of the perchloric acid type, sulfuric acid type, phosphoric acid type, and sulfuric acid-phosphoric acid type maybe used. Since iron and steel have their textures as well as their compositions widely varied by the degrees of heat treatment and machining to be performed thereon, the abradants can be properly selected to suit the heat transfer tubes to be actually used. The amount of acetic anhydride generally added to the electrolyte of the perchloric acid type, the electrolyzing temperature, the current density, voltage and the electrolyzing time, therefore, may be properly selected to suit the heat transfer tubes to be used. Incidentally, the aforementioned seamless steel tubes, cold-finished automatic arc welded steel tubes, and automatic arc welded steel tubes having the welded parts finished by machining may be optionally subjected to mechanical polishing and further to electrolytic polishing.

This invention is characterized by eliminating the protrusions of the heat transfer tubes from the surfaces of tube sheets with the object of preventing the polymerization. The polymerization of the easily polymerizable substance nevertheless is liable to occur not only on the undulations on the surfaces but also in the condensate adhering to the surfaces of tube sheets. For the sake of preventing the polymerization, therefore, it is proper to expel promptly the condensed process fluid from within the shell-and-tube heat exchanger, namely to degrade the surfaces of the tube sheets in surface roughness as described above.

The heat exchanger of this invention is only required to possess the construction mentioned above and has no other restriction. It is allowed to be provided with such implements as a baffle plate, a longitudinal baffle plate, a impingement baffle, a shell flange channel end, a shell flange cover end, shell nozzles, a floating head cover, tie rods and spacers, a vent connection, a drain connection, instrument connection, supporting saddles, lifting lugs, a liquid level connection, and an expansion joint which are possessed by ordinary heat exchangers.

Figure 4D:
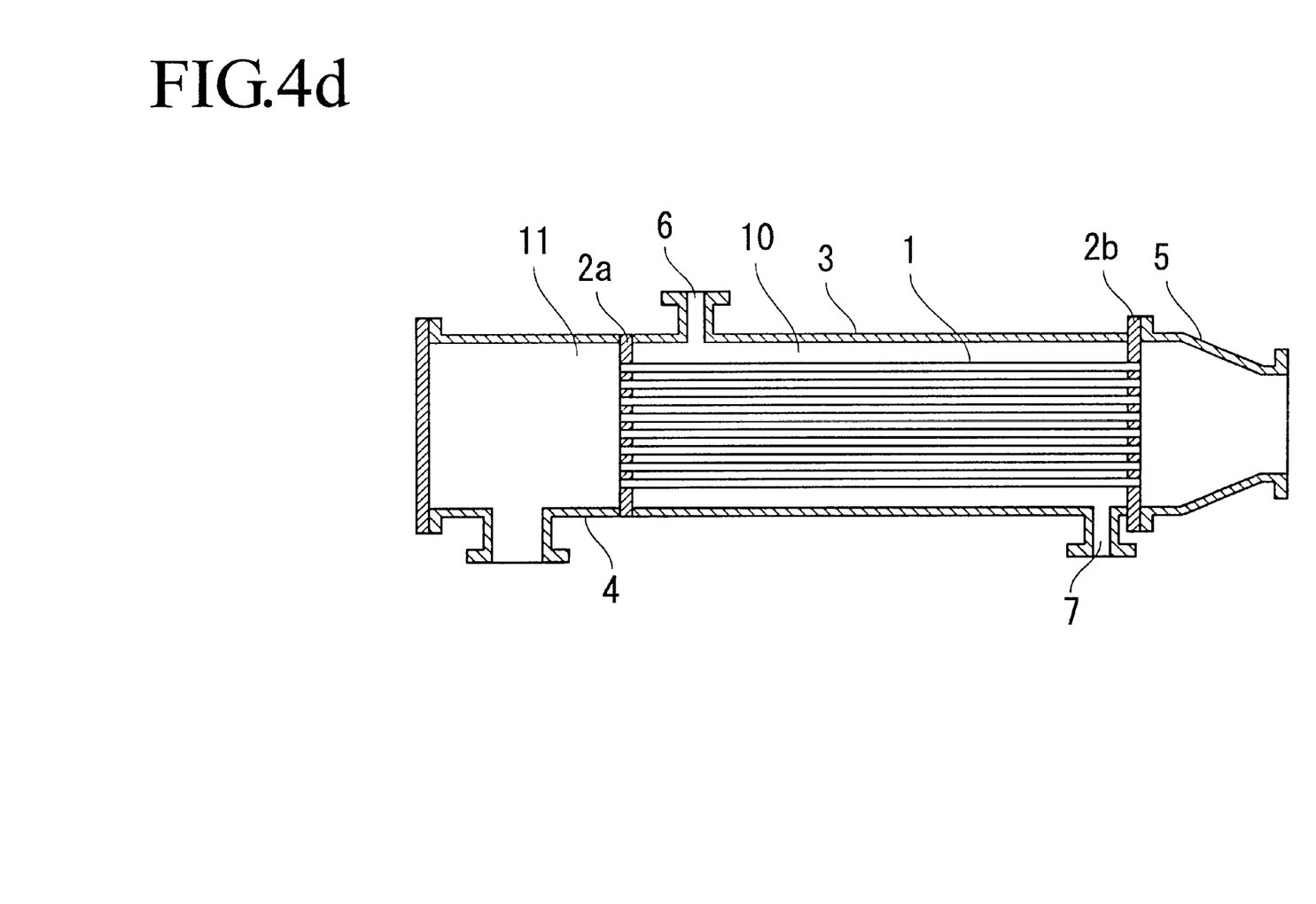

In this invention, the distinction between a vapor and a liquid is irrelevant when the process fluid is an easily polymerizable substance. Further, the heat exchanger of this invention can be used as a cooler, a condenser, a heater, or a vaporizer, whichever fits the occasion best. It may be used as a shell-and-tube heat exchanger which is connected to a distillation column for purifying an easily polymerizable substance, for example. More specifically, the excellent effect of this invention can be obtained when the channel connected to the top of the distillation column for distilling an easily polymerizable substance is in any of the types depicted in FIG. 2 and FIGS. 4a, 4b and 4c, and when the channel connected to the bottom of the distillation column for distilling an easily polymerizable as shown in FIGS. 4c and 4d.

The heat exchanger of this invention can be effectively used in the top part and the bottom part of the distillation column and it can be installed in either of the vertical and the horizontal direction, preferably in the vertical direction. The installation in the vertical direction is preferred because the stagnation of the process fluid in the part of stagnation can be effectively prevented by the spontaneous drop of the condensate.

As concrete examples of the easily polymerizable substance which is effectively handled by the shell-and-tube heat exchanger of this invention, irrespectively of the distinction between vapor and liquid, acrylic acid, methacrylic acid, maleic acid, and esters thereof, and styrene, and acrylonitrile may be cited. The easily polymerizable substances enumerated above may further embrace mixtures thereof with high boiling substances, solvents and by-products which arise during the formation of easily polymerizable substances. Particularly preferred easily polymerizable substances include acrylic acid, methacrylic acid, and esters thereof and they may further embrace such derivatives as mixtures thereof with solvents and other impurities. In the case of acrylic acid and acrylic esters, for example, acetic acid, propionic acid, acrolein, maleic acid, water, and formalin mixtures which are by-produced by the catalytic vapor phase oxidation of acrylic acid may be cited as concrete examples of the derivatives. Then, in the case of methacrylic acid and methacrylic esters, for example, methacrolein, acrylic acid, and acetic acid mixture which are by-produced by the catalytic gas phase oxidation of methacrylic acid may be cited as concrete examples of the derivatives.

The method for using the shell-and-tube heat exchanger of this invention does not need to be particularly discriminated. Nevertheless, this heat exchanger, while handling an easily polymerizable substance, is preferred to have a polymerization inhibitor added to the process fluid. For, this addition results in further exalting the inhibition of the polymerization in the shell-and-tube heat exchanger.

As concrete examples of the polymerization inhibitor which can be advantageously used herein, molecular oxygen-containing gases, hydroquinone, methoquinone, cresol, phenol, t-butyl catechol, diphenyl amine, phenothiazone, and methylene blue; copper chloride compounds such as copper dimethyl dithiocarbamate, copper diethyl dithiocarbamate, copper dibutyl dithiocarbamate, and copper salicylate; manganese salt compounds such as manganese acetate; p-phenylene diamines such as p-phenylene diamine; N-oxyl compounds such as 4-hydroxy-2,2,6,6-tetramethyl piperidinooxyl; ureas such as urea; and thioureas such as thiourea may be cited. The compounds mentioned above may be used either singly or in the form of a combination of two or more members. Among other compounds enumerated above, the molecular oxygen-containing gas proves particularly advantageous. This gas is used preferably because the effect of inhibiting the polymerization is manifested particularly prominently when the process fluid is in a vapor state.

Such polymerization inhibitor as phenothiazine encounters difficulty in repressing the polymerization because it is a high boiling substance and, therefore, is scarcely allowed to exist in the liquid phase part within the heat exchanger. In contrast, the molecular oxygen-containing gas is preferably used because it can exist in a gaseous state and, therefore, inhibit effectively the polymerization of an easily polymerizable substance in the heat exchanger.

The amount of the molecular oxygen-containing gas to be added is properly in the range of 0.01–5 vol. %, preferably 0.02–3 vol. %, and particularly preferably 0.1–1 vol. %, based on the amount of the vapor produced by the vaporization of a relevant easily polymerizable substance. The term "amount of the vapor" as used herein means the total amount of the monomer vapor of the easily polymerizable substance supplied to the heat exchanger. As respects the method for supplying the molecular oxygen-containing gas, the gas may be directly mixed as by bubbling with the easily polymerizable substance or it may be dissolved in a solvent and indirectly mixed therewith, whichever fits the occasion better. The bubbling can be easily effected by supplying the molecular oxygen-containing gas in the vapor state from the bottom of the distillation column and/or the re-boiler.

The method for adding other polymerization inhibitor to the process fluid does not need to be particularly discriminated. The addition may be effected by directly introducing the inhibitor into the distillation column or by dissolving the inhibitor in a feeding liquid, a refluxing liquid, or other solvent and introducing the resultant solution via the feeding line.

The heat exchanger of this invention is characterized by not suffering stagnation of the process fluid on the surfaces of tube sheets destined to contact the process fluid. This heat exchanger can be used in the same manner as the conventional shell-and-tube heat exchanger. The use of the heat exchanger in the case of handling an acrylic acid-containing solution as an example of the easily polymerizable substance will be described below with reference to FIG. 6.

Figure 6:
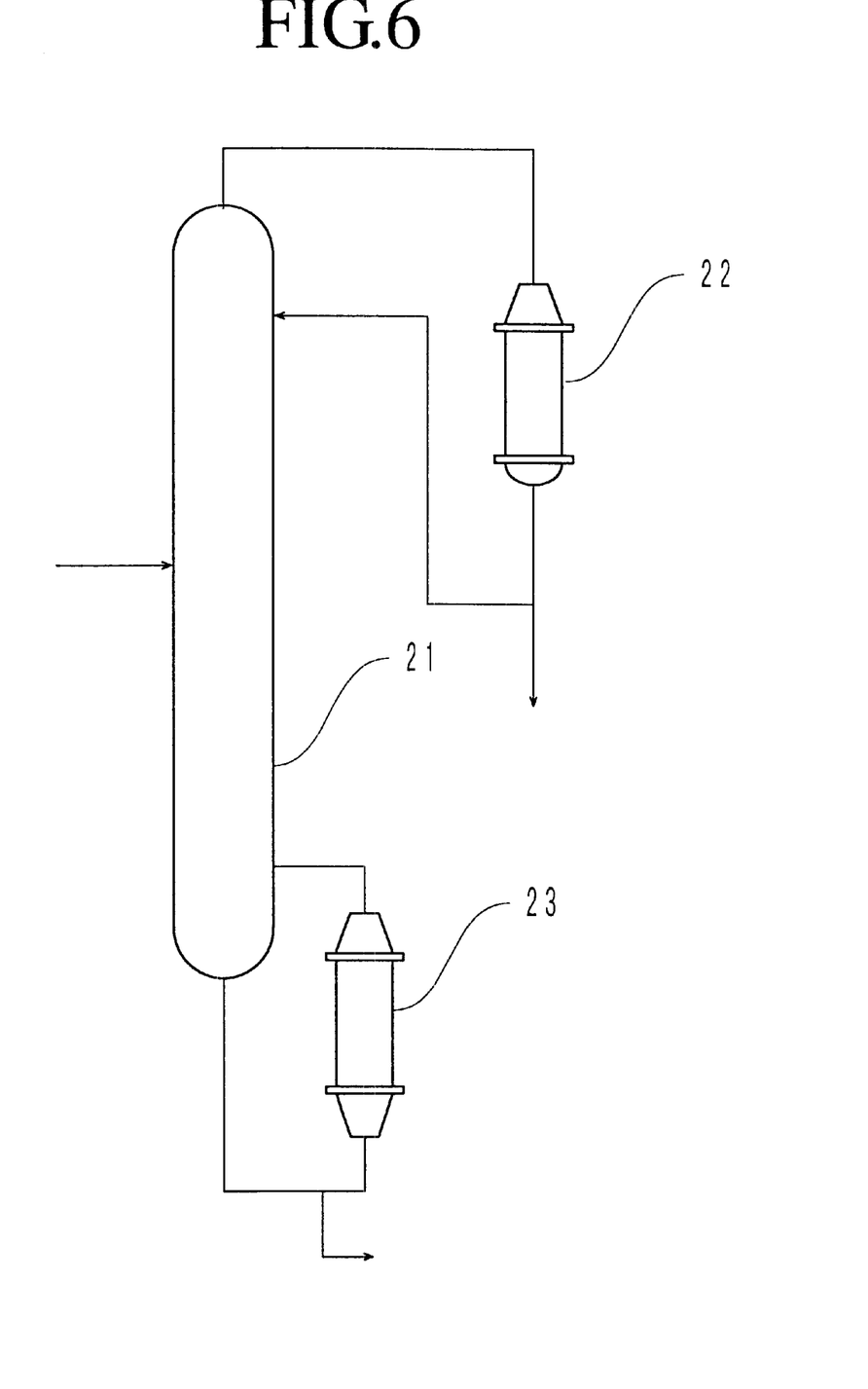
FIG. 6 is a diagram illustrating a construction having a vertical shell-and-tube heat exchanger (condenser) (22) connected to a distillation column (21) and having a vertical shell-and-tube heat exchanger (re-boiler) (23) supported below the distillation column.

FIG. 6 is an explanatory diagram illustrating a construction in which a vertical shell-and-tube heat exchanger (22) (condenser) is connected to a distillation column (21) and a vertical shell-and-tube heat exchanger (23) (re-boiler) is disposed below the distillation column (21).

The acrylic acid-containing gas which is obtained by subjecting propylene and/or acrolein to catalytic gas phase oxidation is brought into contact with water to collect the acrylic acid as an aqueous acrylic acid solution. The crude acrylic acid which is obtained by distilling the aqueous acrylic acid solution in the presence of an azeotropic solvent is treated, as necessary for purification, in another distillation column and the effluent therefrom is subsequently introduced into a high boiling impurity separating column for further purification. The distillate consequently formed in the bottom of the column is put to use.

The distillation column does not need to be particularly discriminated but is only required to be capable of distilling an easily polymerizable substance. As concrete examples of the distillation column, a packed column, a plate column (tray column), a wetting wall column, and a spray column may be cited. Among other types of column mentioned above, the plate column (tray column) proves particularly proper from the view point of prevention of polymerization and column efficiency.

When the polymerization inhibitor is added to the acrylic acid-containing solution in the use of the shell-and-tube heat exchanger of this invention, any of the various compounds which are generally accepted as polymerization inhibitors for easily polymerizable substances can be used for this addition. Among other polymerization inhibitors mentioned above, specifically at least one member selected from among hydroquinone, methquinone, cresol, phenol, t-butyl catechol, diphenyl amine, phenothiazine, and methylene blue, p-phenylene diamines such as p-phenylene diamine, N-oxyl compounds such as 4-hydroxy-2,2,6,6-tetramethyl piperidinoxyl, and molecular oxygen-containing gases can be used particularly advantageously. The compounds enumerated above may be used either singly or in the form of a combination of two or more members. From the viewpoint of the effect in preventing polymerization, the degree of corrosion caused on the distillation column, and the ease with which the waste effluent from the distillation column is treated, particularly preferable polymerization inhibitors are phenothiazine and/or N-oxyl compounds, and molecular oxygen-containing gases.

The amount of the polymerization inhinitor to be used is not particularly limited. The total amount of the polymerization inhibitor, however, is preferred to be in the range of 1–1000 ppm (by weight) based on the amount of the vapor of acrylic acid. As respects the method for supplying the molecular oxygen-containing gas, this gas may be directly mixed as by bubbling with the acrylic acid-containing solution or the gas may be dissolved in advance in a solvent and the resultant solution may be subsequently mixed therewith. The bubbling can be easily effected by supplying the molecular oxygen-containing gas in a gaseous state from the bottom of the distillation column and/or the re-boiler. Properly, the molecular oxygen-containing gas is supplied generally at a ratio in the range of 0.1–1 vol. % based on the amount of the vapor of acrylic acid.

Though the treatment of methacrylic acid has many points in common with the treatment of acrylic acid described above, these treatments are different in the following points. For example, the methacrylic acid-containing solution must be led to an extracting step for extraction of methacrylic acid with a solvent before it is led to the distillation column. In spite of the difference, the subsequent polymerization in the shell-and-tube heat exchanger can be prevented by fulfilling the conditions proposed by this invention.

According to this invention, the stagnation of the process fluid on the surfaces of the tube sheets can be prevented by eliminating the protrusions of the heat transfer tubes on the surfaces of the tube sheets exposed to contact with the process fluid in the shell-and-tube heat exchanger. This prevention of the stagnation results in effectively inhibiting the polymerization when the process fluid is an easily polymerizable substance.

In the shell-and-tube heat exchanger of this invention, the otherwise possible polymerization can be prevented very effectively. It has been experimentally demonstrated that the otherwise inevitable adhesion of a polymer to the inner surfaces of the heat exchanger can be perfectly inhibited in a protracted operation continued for 4 months. Thus, the protracted continuous operation which has been heretofore obstructed by the occurrence of polymerization can be realized by this invention. By operating the heat exchanger while feeding a molecular oxygen-containing gas to an easily polymerizable substance, the polymerization of the easily polymerizable substance can be effectively inhibited.

Further, according to this invention, the parts for stagnating the process fluid can be eliminated from the interiors of the heat transfer tubes and the polymerization can be inhibited effectively by using seamless steel tubes, cold-finished automatic arc welded steel tubes, and automatic arc welded steel tubes having the welded parts finished by machining for the heat transfer tubes in the shell-and-tube heat exchanger. Particularly, the effect in preventing the polymerization is veritably excellent as evinced by the fact that the magnitude of surface roughness, Ry, defined in JIS B 0601 (-1994), of the surfaces of the heat transfer tubes for contact with the process fluid is not more than 12.5. The adhesion of polymer, therefore, is inhibited very effectively in the operation continued for 4 months. Thus, the protracted continuous operation which has been heretofore obstructed by the occurrence of polymerization can be realized.

EXPERIMENTS

Now, this invention will be described more specifically below with reference to working examples.

EXAMPLE 1

Acrylic acid was purified by using a distillation column measuring 1000 mm in inside diameter and incorporating therein a stainless steel (SUS 316) sieve tray provided with 45 stages. A distilled acrylic acid-containing solution composed of 95 wt. % of acrylic acid and 3 wt. % of acetic acid was fed, after adding 200 ppm of phenothiazine as a polymerization inhibitor to the distillation column. The solution was rectified therein under the conditions of 53.3 hpa(absolute) of pressure and 60° C. of temperature in the top of the column, 126.7 hPa(absolute) of pressure and 85° C. of temperature in the bottom of the column, and 8 of reflux ratio with preparing 0.3 vol. % of molecular oxygen-containing gas based on the amount of the vapor produced by the vaporization of acrylic acid in the re-boiler.

A condenser was connected to the top of this distillation column. The condenser was formed by welding component heat transfer tubes fast to tube sheets. The re-boiler was connected to the bottom of the distillation column. The component heat transfer tubes were welded fast to tube sheets. The heat transfer tubes had no protrusion thereof protrude from the surfaces of the tube sheets. The surfaces of the tube sheets of the condenser and the re-boiler had a surface roughness, Ry=12.5, they showed no sign of adhesion of a polymer.

When the surfaces of the tube sheets and the nozzles of the condenser and the re-boiler were inspected after four months continued operation, there was not observed any adhesion of polymer.

Control 1

The distillation column was operated by following the procedure of Example 1 while using a condenser and a re-boiler both having protrusions of heat transfer tubes, averaging 1 mm, formed on the surfaces of tube sheets instead.

When the surfaces of the tube sheets and the nozzles of the condenser and the re-boiler were inspected after four months' continued operation, the surfaces of tube sheets in the part for stagnation in the condenser were found to retain about 200 liters of polymer and the surfaces of tube sheets in the re-boiler to retain about 300 liters of polymer and the heat transfer tubes in the re-boiler were found to be clogged with about 5% of polymer deposit.

EXAMPLE 2 Case of Avoiding use of Molecular Oxygen-containing Gas

Acrylic acid was purified by using a distillation column measuring 750 mm in inside diameter and incorporating therein a stainless steel (SUS 316) sieve tray provided with 50 stages. A distilled acrylic acid-containing solution composed of 75 wt. % of acrylic acid and 25 wt. % of acetic acid was fed, after adding 300 ppm of a polymerization inhibitor (using phenothiazine as a reagent), to the distillation column. The solution was rectified therein under the conditions of 46.7 hPa (absolute) of pressure and 42° C. of temperature in the top of the column, 133.3 hPa(absolute) of pressure and 86° C. of temperature in the bottom of the column, and 10 of reflux ratio.

A condenser and a re-boiler annexed to the rectification column used the acrylic acid-containing solution as the tube side fluid. Seamless stainless steel tubes having a surface roughness, Ry defined in JIS B 0601, of 12.5 were used for heat transfer tubes.

After four months of continued operation, the clog was observed to occur in not more than 1% of all the tubes used in both the condenser and the re-boiler.

Control 2

The distillation column was operated by following the procedure of Example 1 while using a condenser and a re-boiler both incorporating therein welded tubes as heat transfer tubes instead. When the tubes in the condenser and a re-boiler were tested for appearance after four months of continued operation, the condenser was found to have clog of 5% and the re-boiler clog of 7%.

The entire disclosure of Japanese Patent Application No. 11-065403 filed on Mar. 11, 1999, and Japanese Patent Application No. 11-070503 filed on Mar. 16, 1999 including specification, claims, drawing and summary are incorporated herein by reference in its entirety.

What is claimed is:

1. A shell-and-tube heat exchanger for handling an easily polymerizable substance, comprising a shell having near the opposite terminals thereof two tube sheets respectively furnished with an inlet and an outlet for shell side fluid, channels disposed one each at the opposite terminals of said shell, and a multiplicity of heat transfer tubes having peripheries of opposite terminal parts of said heat transfer tubes fixed between said tube sheets, adapted to pass said easily polymerizable substance as a process fluid through said tubes and effect exchange of heat thereon, wherein said shell-and-tube heat exchanger has no part for stagnation of said process fluid on a surface of said shell-and-tube heat exchanger which contacts with said process fluid and said shell-and-tube exchanger exposed to said process fluid have a surface roughness, Ry, defined as in a rough curved line which is set on a horizontal line and cut off in a standard length along the horizontal line, the height of the top of the rough from the horizontal line, the height of the rough from the horizontal line and the depth of bottom of the rough from the horizontal line, of not more than 12.5 μm.

2. A shell-and-tube heat exchanger according to claim 1, wherein connecting parts between said tube sheets and said heat transfer tubes have no part for stagnation of said process fluid.

3. A shell-and-tube heat exchanger according to claim 1, wherein said heat transfer tubes have no protrusion on surfaces of said tube sheets exposed to said process fluid.

4. A shell-and-tube heat exchanger according to claim 1, wherein said heat exchanger has a vertical construction and said heat transfer tubes have no protrusion at least on a surface of an upper tube sheet.

5. A shell-and-tube heat exchanger according to claim 1, wherein said heat transfer tubes are attached to said tube sheets by welding.

6. A shell-and-tube heat exchanger according to claim 1, wherein said heat transfer tubes built in said shell-and-tube heat exchanger are one or more kinds selected from seamless steel tubes, cold-finished automatic arc welded steel tubes, and automatic arc welded steel tubes having the welded parts finished by machining.

7. A shell-and-tube heat exchanger according to claim 1, wherein surfaces of said shell-and-tube heat exchanger exposed to said process fluid have a surface roughness, Ry, defined as in a rough curved line which is set on a horizontal line and cut off in a standard length along the horizontal line, the height of top of the rough from the horizontal line and the depth of bottom of the rough from the horizontal line, of not more than 12.5 μm.

8. A shell-and-tube heat exchanger according to claim 1, wherein said heat exchanger is a condenser connected to a top of a distillation column.

9. A shell-and-tube heat exchanger according to claim 1, wherein said heat exchanger is a re-boiler connected to a bottom part of a distillation column.

10. A shell-and-tube heat exchanger according to claim 1, wherein said easily polymerizable substance is (meth) acrylic acid and/or an ester thereof.

11. A shell-and-tube heat exchanger according to claim 1, wherein said heat transfer tubes have no protrusion on surfaces of said tubes exposed to said process fluid and, said tubes are one or more kinds selected from seamless steel tubes, cold-finished automatic arc welded steel tubes, and automatic arc welded steel tubes having the welded parts finished by machining.

12. A shell-and-tube heat exchanger according to claim 1, wherein said heat transfer tubes have no protrusion on the surfaces of said tubes exposed to said process fluid, and the surfaces said tubes exposed to said process fluid have a surface roughness, Ry, defined as in a rough curved line which is set on a horizontal line and cut off in a standard length along the horizontal line, the height of top of the rough from the horizontal line and the depth of bottom of the rough from the horizontal line, of not more than 12.5 μm.

13. In the operation of a shell-and-tube heat exchanger set forth in claim 1 by passing there through an easily polymerizable substance as a process fluid thereby effecting change of heat thereon, a method for inhibiting polymerization in a shell-and-tube heat exchanger comprising the step of:

providing said process fluid with a polymerization inhibitor.

14. A method according to claim 13, wherein said polymerization inhibitor is a molecular oxygen-containing gas.

15. A method according to claim 14, wherein the amount of said molecular oxygen-containing gas to be contained in said process fluid is in a range of 0.01–5 vol. % based on the amount of the vapor of said process fluid.

16. A method for preparing (meth)acrylic acid and/or an ester thereof using said shell-and-tube heat exchanger according to claim 1 comprising:

(a) passing said (meth)acrylic acid/or an ester through said shell-and-tube exchanger exposed to said (meth) acrylic acid/or an ester having a surface roughness, Ry, defined as in a rough curved line which is set on a horizontal line and cut off in a standard length along the horizontal line, the height of the top of the rough from the horizontal line, the height of the rough from the horizontal line and the depth of bottom of the rough from the horizontal line, of not more than 12.5 μm, and (b) passing said (meth)acrylic acid/or an ester through said heat transfer tubes wherein said heat transfer tubes have a surface roughness, Ry, defined as in a rough curved line which is set on a horizontal line and cut off in a standard length along the horizontal line, the height of the top of the rough from the horizontal line, the height of the rough from the horizontal line and the depth of bottom of the rough from the horizontal line, of not more than 12.5 μm.

17. A method according to claim 16, wherein said shell-and-tube heat exchanger is a condenser and/or a re-boiler.

* * * * *